US 6,694,411 B2

(12) United States Patent
Bonola

(10) Patent No.: US 6,694,411 B2
(45) Date of Patent: Feb. 17, 2004

(54) TECHNIQUE FOR IMPLEMENTING A DISTRIBUTED LOCK IN A PROCESSOR-BASED DEVICE

(75) Inventor: Thomas J. Bonola, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 258 days.

(21) Appl. No.: 09/966,503

(22) Filed: Sep. 28, 2001

(65) Prior Publication Data

US 2003/0065894 A1 Apr. 3, 2003

(51) Int. Cl.[7] ............................. G06F 12/08; G06F 12/14
(52) U.S. Cl. ........................ 711/152; 711/151; 711/163
(58) Field of Search .............................. 711/151, 152, 711/163; 713/200

(56) References Cited

PUBLICATIONS

Andrew S. Tanenbaum and Albert S. Woodhull, Operating Systems: Design and Implementation, Prentice Hall, Second Edition, pp. 59–68.*

Thomas E. Anderson, "The Performance of Spin Lock Alternatives for Shared–Memory Multiprocessors," IEEE Transactions on Parallel and Distributed Systems, vol. 1, No. 1, Jan. 1990.

John M. Mellor–Crummey[1] and Michael L. Scott[2], "Algorithms for Scalable Synchronization on Shared–Memory Multiprocessors," ACM Transactions on Computer Systems, Feb. 1991.

Ingo Molnar, "Re: possible spinlock optimizations," pp. 1–2, Sep. 28, 1999.

Mark Russinovich, "Inside Win2K Scalability Enhancements, Part 2, " 11 pages, Dec. 1999.

Mark Russinovich, "Win2K Queued Spinlocks," pp. 1–2, date unknown.

* cited by examiner

Primary Examiner—Mano Padmanabhan
Assistant Examiner—Midys Inoa

(57) ABSTRACT

A technique for implementing a distributed lock for a shared resource accessible by a plurality of requesters in a processor-based device. The lock is implemented as an array of memory locations, in which the size of each memory location corresponds to a cache line size. Each requester attempting to acquire the lock is assigned a particular memory location at which to wait until lock ownership is available. Acquisition and release of the lock is facilitated by a token-passing scheme.

12 Claims, 4 Drawing Sheets

RELEASE

TECHNIQUE FOR IMPLEMENTING A DISTRIBUTED LOCK IN A PROCESSOR-BASED DEVICE

BACKGROUND OF THE INVENTION

1. Field of the Invention

The present invention relates generally to processor-based devices and, more particularly, to a technique for implementing a lock that controls access to a shared resource accessible by a plurality of requesters in a processor-based device.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The use of computers has increased dramatically over the past few decades. In years past, computers were relatively few in number and primarily used as scientific tools. However, with the advent of standardized architectures and operating systems, computers soon became virtually indispensable tools for a wide variety of business applications. The types of computer systems similarly have evolved over time. For example, early scientific computers typically were stand-alone systems designed to carry out relatively specific tasks and required relatively knowledgeable users.

As computer systems evolved into the business arena, mainframe computers emerged. In mainframe systems, users utilized "dumb" terminals to provide input to and to receive output from the mainframe computer while all processing was done centrally by the mainframe computer. As users desired more autonomy in their choice of computing services, personal computers evolved to provide processing capability on each user's desktop. More recently, personal computers have given rise to relatively powerful computers called servers. Servers are typically multi-processor computers that couple numerous personal computers together in a network. In addition, these powerful servers are also finding applications in various other capacities, such as in the communications and Internet industries.

In many servers, multiple requesters (e.g., software threads, processors, hardware, etc.) may contend for access to shared resources, such as memory. Each time a requester accesses memory, it is likely that the contents of a memory location will be altered. Thus, care must be taken in a system that provides for concurrent access to a shared resource to ensure that a requester is accessing valid data. In addition to problems arising from concurrent requests, a requester that has control of the resource may be interrupted, thus providing yet further opportunity for another requester to alter the contents of the shared resource. Without some sort of scheme to govern requests for access to a shared resource, data processing errors or unrecoverable faults may occur.

In many systems, multiple requests to a shared resource are governed by an arbitration scheme which grants only one requester at a time access to a shared resource. The arbitration scheme typically results in a lock being placed on the critical region of the shared resource such that the other requesters are blocked until the current requester has completed the operation and released the lock. Such arbitration schemes become less effective as the number of requesters increases, as each requester must wait its turn to access the resource. Further, because the acts of acquiring and releasing the lock may result in communications being transmitted to each of the other waiting requesters, consumption of bus bandwidth and latency increase. Thus, these arbitration schemes may not readily scale to execution environments in which a large number of concurrent requests to a shared resource are possible.

In many known arbitration schemes, a lock to a particular shared resource typically is implemented as a memory location in the memory subsystem of the server or other processor-based device. To acquire ownership of the lock, a requester examines the appropriate field in the memory location to determine whether ownership of the lock is available. For instance, the memory location for implementing the lock may include a lock bit that is set (i.e., set to a logical "1" state) when the lock is owned and cleared (i.e., set to a logical "0" state) when the lock is available. If the lock is available, the requester sets the lock bit to the owned state and acquires the lock. However, because a variable in the memory location is altered when the requester acquires the lock, a communication must be sent to all requesters who have access to that memory location and, thus, a cache memory line that may be affected by the change.

While the lock is owned, each of the waiting requesters repeatedly examines the state of the lock bit to determine whether the lock has been released. When the lock is released, ownership of the lock is acquired by the first waiting requester that happens to reach the lock bit. Thus, passing of the ownership of the lock may not be performed in a particularly fair manner between waiting requesters having the same priority. Further, release of the lock involves changing the state of the lock bit, which again results in a communication that is sent to all requesters having access to the memory location.

Thus, known techniques for implementing a lock for a shared resource are not particularly efficient when utilized in a processor-based device in which a large number of requesters have access to the shared resource. The acts of acquiring and releasing the lock generate a great deal of traffic on the bus, thus having a detrimental effect on latency. Further, the act of passing ownership of the lock to another waiting requester is not necessarily implemented in a fair manner, thus creating uncertainty as to when a particular requester may acquire the lock.

Accordingly, it would be desirable to provide a scheme for arbitrating a lock on a shared resource that would minimize the number of communications transmitted on the bus when the lock is acquired and released. Such a scheme would be particularly useful in which a large number of requesters are contending for access to the shared resource. Further, the scheme would facilitate distributing ownership of the lock in a fair manner.

The present invention may be directed to addressing one or more of the problems set forth above.

DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
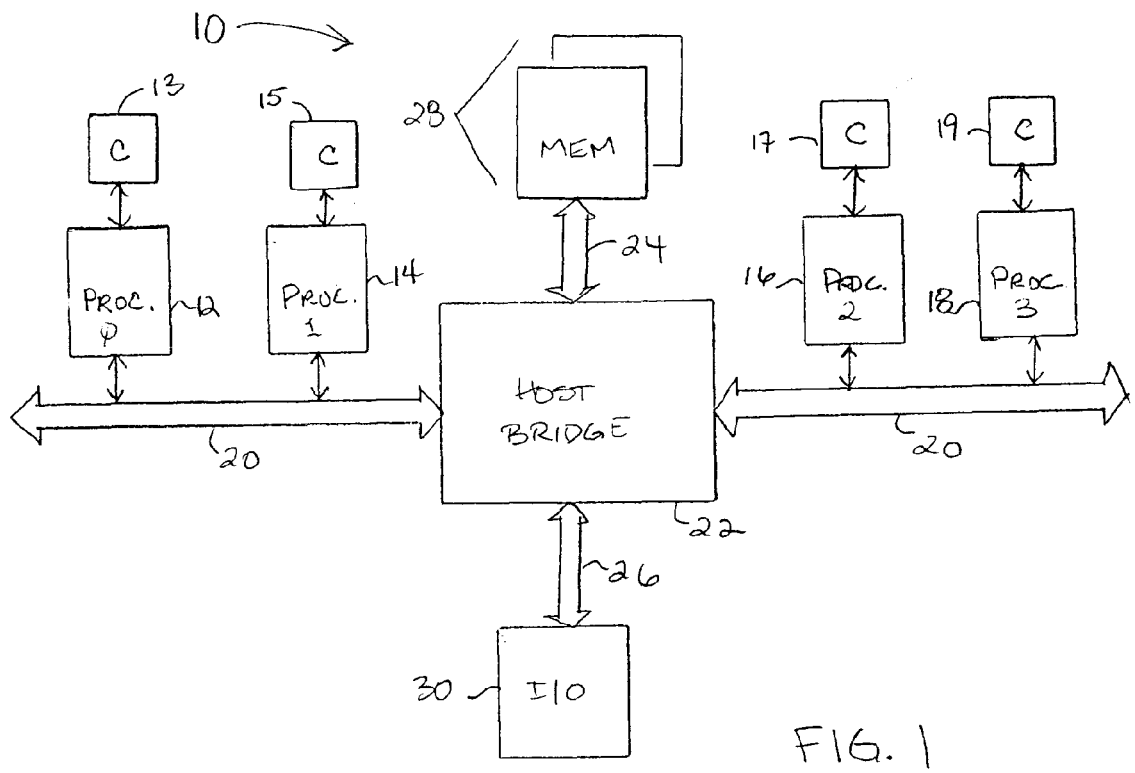
FIG. 1 illustrates a block diagram of an exemplary processor-based device.

Turning now to the drawings and referring first to FIG. 1, an exemplary processor-based device 10 is illustrated in which the innovative distributed lock may be utilized. The processor-based device 10 is a multi-processor device, such as a server, which includes host processors 12, 14, 16, and 18 coupled to a host bus 20. The processors 12, 14, 16, and 18 may be any of a variety of types of known processors, such as an x86 or PENTIUM® based processor, an ALPHA® processor, a POWERPC® processor, etc. The host bus 20 is coupled to a host bridge 22 which manages communications between the host bus 20, a memory bus 24, and an I/O bus 26. The memory bus 24 connects the processors 12, 14, 16, and 18 to a shared memory resource 28, which may include one or more cacheable memory devices, such as ROM, RAM, DRAM, SRAM, etc. In addition to the shared memory resource 28, each host processor 12, 14, 16, and 18 has access to a local cache memory 13, 15, 17, and 19, respectively. The I/O bus 26 provides for communications to any of a variety of input/output or peripheral devices 30 (e.g., a modem, printer, etc.), which may be shared among the multiple processors 12, 14, 16, and 18 and which also may have access to the shared memory resource 28.

Various other devices not shown also may be in communication with the processors 12, 14, 16, and 18. Such other devices may include a user interface having buttons, switches, a keyboard, a mouse, and/or a voice recognition system, for example.

Figure 2:
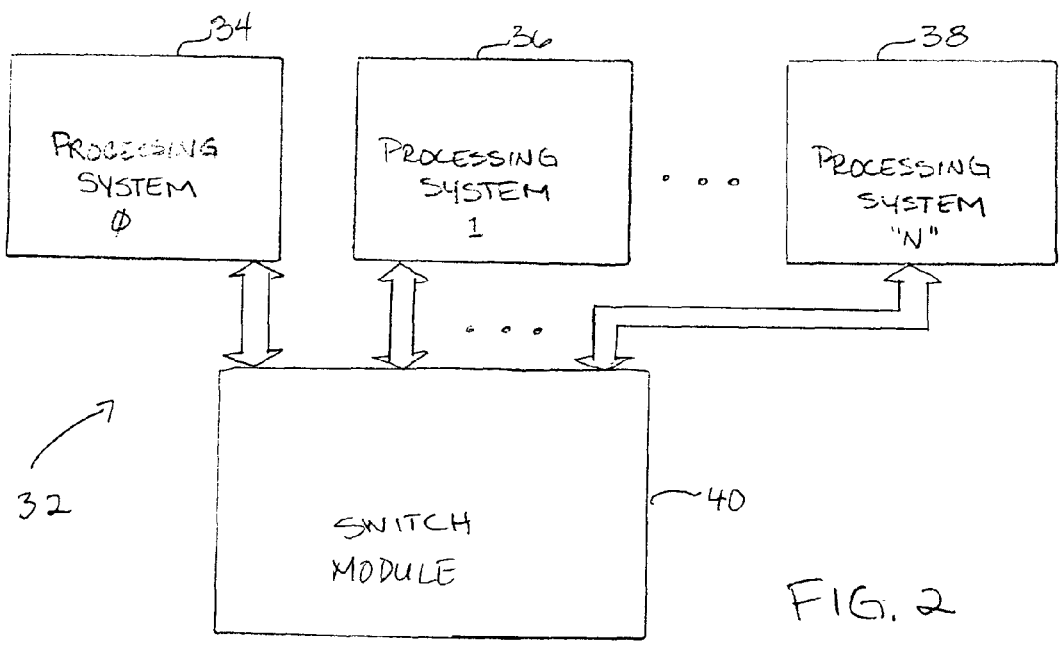
FIG. 2 illustrates a block diagram of another exemplary processor-based device.

FIG. 2 illustrates another exemplary embodiment of a processor-based device 32 (e.g., a server) which may implement the lock technique of the present invention. In this embodiment, multiple processing systems 34, 36, and 38 are connected to a cache-coherent switch module 40. Each processing system 34, 36, and 38 may include multiple processors (e.g., four processors), and each system 34, 36, and 38 may be configured substantially similar to the processor-based device 10 illustrated in FIG. 1.

In the embodiments of a processor-based device illustrated in FIGS. 1 and 2, it can be seen that it is possible to have several entities concurrently attempting to access a shared resource. Arbitration schemes which are implemented via the use of locks generally have a detrimental effect on latency. Further, such schemes are quite intrusive on the buses and the host bridge or switch module of the processor-based device because the schemes involve the exchange of many communications between the entities having access to the shared resource. For example, each time a requester attempts to acquire a lock, a message is sent to all other entities having access to the lock. Similarly, each time a lock is released, a message is sent to the other entities. Once the lock is released, the requesters all retransmit their requests in an attempt to gain ownership of the lock, and the distribution of ownership of the lock may not be performed in a fair manner.

Figure 3:
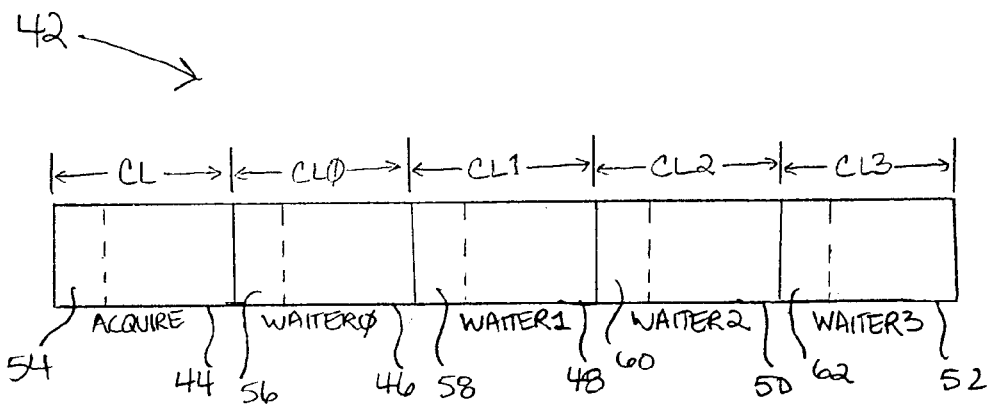
FIG. 3 illustrates an exemplary embodiment of a memory structure for implementing a lock that may be employed in the processor-based devices shown in FIGS. 1 and 2.

Turning now to FIG. 3, a memory structure for implementing a lock that overcomes the disadvantages of known lock implementations is shown. In the exemplary embodiment, the memory structure comprises an array 42 of cacheable memory locations 44, 46, 48, 50, and 52 in, for example, the host memory 28 of the processor-based device 10 or in any of the host memories in the processing systems 34, 36, or 38 in the processor-based device 32. The size of each of the memory locations 44, 46, 48, 50, and 52 corresponds to a size of a cache line. In any particular embodiment, the size of the cache line will be dependent on the cache architecture of the processors 12, 14, 16, and 18 in the processor-based device. Thus, for instance, the size of each of the memory locations 44, 46, 48, 50, and 52 may be one of 32 bytes, 64 bytes, 128 bytes, etc.

In the exemplary embodiment, only the first quadword of each memory location 44, 46, 48, 50, and 52 contains data used in the lock acquisition and release scheme of the present invention. These quadwords are represented in FIG. 3 as the fields 54, 56, 58, 60, and 62. The remainder of the bits in the memory locations 44, 46, 48, 50, and 52 may be padded with, for instance, "0's," to fill out the cache line. In other embodiments, more or fewer bits may be used as may be appropriate.

In FIG. 3, a total of five memory locations 44, 46, 48, 50, and 52 are shown in the array 42, although different embodiments may employ a different number of memory locations, as will be explained below. The memory locations include an Acquire location 44 and four Waiter locations 46, 48, 50, and 52. The Acquire location 44 stores data in the field 54 which is representative of a token that allows a requester to acquire ownership of the lock. The value of the token retrieved by a requester also establishes the order in which the requester will acquire ownership of the lock. For instance, each time a requester attempts to acquire the lock, the requester first retrieves a value of a token from the Acquire location 44 and then increments the value of the token stored at the Acquire location 44. Thus, each successive requester attempting to acquire the lock retrieves a token having a value that is sequential to the value of the token retrieved by the immediately preceding requester. Ownership of the lock is passed to a requester based on the value of the requester's token.

Because the size of the Acquire memory location 44 spans a cache line and because the Acquire memory location 44 contains only one variable which is stored in the first quadword (i.e., the field 54), the amount of data that must be transmitted to the other requesters when the token value is altered is minimal because only the first quadword can include any change.

The Waiter locations 46, 48, 50, and 52 also include data in only the first quadword or field 56, 58, 60, and 62, respectively. The data in the first quadword indicates whether a requester that has been assigned to the particular Waiter location may acquire ownership of the lock, as will be described in detail below. The number of Waiter locations 46, 48, 50, and 52 in any array 42 corresponds to at least the number of requesters who have access to the shared resource associated with the lock. In the exemplary embodiment, to facilitate assignment of Waiter locations to each requester, the number of Waiter locations is equal to the number of requesters rounded up to the closest power of two. Thus, in a processor-based device in which three requesters may contend for ownership of the lock, four (i.e., $2^2$) Waiter locations 46, 48, 50, and 52 are provided in the array 42. Similarly, in a processor-based device having four requesters, four Waiter locations also are provided. Further, in a processor-based device having five to eight requesters, eight (i.e., $2^3$) Waiter locations are provided in the array 42, and so forth.

A particular Waiter location 46, 48, 50, or 52 is assigned to a requester based on the value of the token retrieved by that requester from the field 54 in the Acquire memory location 44. In the exemplary embodiment, each Waiter location can be identified by an identifier, such as a line number, and the identifier of the assigned Waiter location can be extracted from the value of the retrieved token as described below. For instance, as previously discussed, the contents of the field 54 in the Acquire location 44 are incremented each time a token is retrieved by a requester. However, because the number of bits in the field 54 bear no relationship to the number of Waiter locations, the token value in field 54 does not directly correspond to a line number of a Waiter location.

This problem may be overcome by ensuring that the number of Waiter locations corresponds to a power of two. Thus, the line number of the Waiter location can be extracted from the retrieved token value by combining an appropriate mask with the contents of the field 54. For instance, in an array 42 having four Waiter locations 46, 48, 50, and 52, the token value always must correspond to one of four different memory locations. Thus, only the two lower bits of the field 54 need be used to maintain a correspondence between the token value and the number of Waiter locations. To extract the two lowest bits of the field 54, a mask having all "0's" except for the two lowest bits, which are "1's", can be combined, using a bit-wide AND operation, with the contents of the field 54. Similarly, in an array 42 having eight Waiter locations, a mask can be combined with the quadword 54 in a manner which extracts the three lowest bits.

Having been assigned a Waiter memory location 46, 48, 50, or 52 corresponding to the value of the retrieved token, the requester then waits until the contents of the assigned Waiter location indicate that the requester may acquire ownership of the lock. For example, in one embodiment, the lock becomes available when the data stored in the field 56 of the Waiter location 46 match the value of the token that was retrieved by the requester assigned to the Waiter location 46. In other embodiments, availability of lock ownership may be indicated in other appropriate manners. However it can be seen that by structuring the array 42 such that the number of Waiter locations corresponds to at least the number of requesters that can contend for ownership of the lock, then it is possible that only one requester at a time can be assigned to any particular Waiter location. Further, because each Waiter location spans a cache line, only the requester assigned to that Waiter location can have a cache line that may be affected by a change in the contents of the Waiter location. Thus, when the data in the field 56 is altered to indicate that ownership of the lock is available, only the requester assigned to the Waiter location 46 is informed of the change, thus greatly reducing the amount of traffic on the bus. Still further, because each Waiter location contains only one variable (i.e., in the field 56, 58, 60, or 62) the amount of data that is transmitted on the bus when informing the requester of the change also is reduced.

Ownership of the lock may become available when a previous requester (i.e., the lock owner) releases the lock. In an exemplary embodiment, the lock owner releases the lock by altering the contents of the next sequential Waiter location (e.g., Waiter location 48) to indicate that ownership now may be acquired by the requester waiting at that Waiter location. The line number of the next sequential Waiter location can be determined by incrementing the token value that had been retrieved by the lock owner and then extracting the identifier for the Waiter location from the incremented token value. The lock owner then may alter the contents (e.g., the field 58) of the Waiter location (e.g., Waiter location 48) which corresponds to this extracted line number to indicate that lock ownership is available.

By implementing a token scheme in which the values of the token are sequentially incremented, and by passing ownership of the lock to the next sequential Waiter location, arbitration of ownership of the lock is performed in a fair manner. That is, in accordance with such a scheme, a requester is guaranteed to acquire ownership of the lock in the same order in which the requester originally requested the lock.

Figure 4:
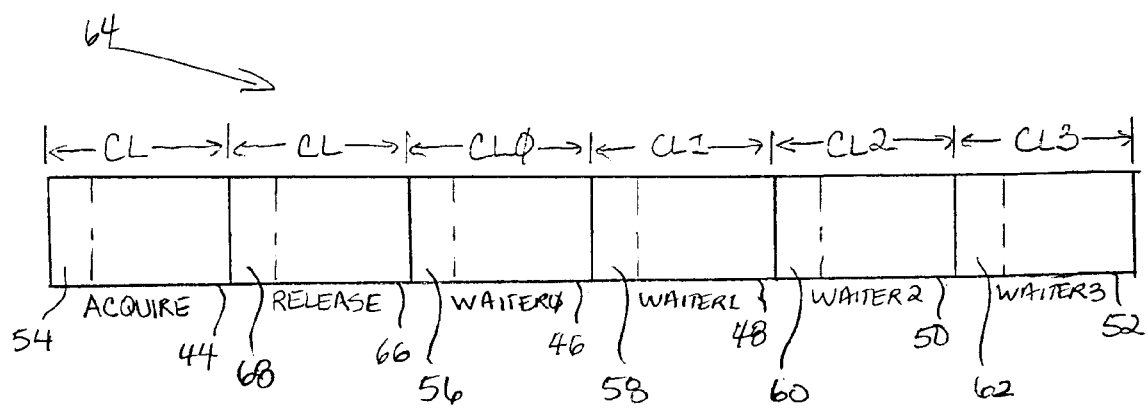
FIG. 4 illustrates a flowchart of an exemplary technique for acquiring ownership of a lock that is implemented using the memory structure shown in FIG. 3.

FIG. 4 illustrates another exemplary embodiment of an array 64 having a plurality of memory locations. Similar to the embodiment of the array 42 illustrated in FIG. 3, the array 64 in FIG. 4 includes the Acquire memory location 44, and the four Waiter memory locations 46, 48, 50, and 52. As discussed above, each of memory locations 44, 46, 48, 50, and 52 have a size that corresponds to a cache line size for the particular application in which the lock is being implemented. Further, the contents of each of the locations 44, 46, 48, 50, and 52 include only one variable which is stored in a field 54, 56, 58, 60, and 62, respectively (e.g., the first quadword of each of the memory locations).

In addition to the Acquire location 44 and the Waiter locations 46, 48, 50, and 52, the array 64 in FIG. 4 also includes a Release memory location 66. The Release location 66 also has a size that corresponds to a cache line size and has only one variable which is stored in a field 68 (e.g., the first quadword). The Release location 66 may be used to store a variable related to the release of the lock. For example, the field 68 may hold a value that corresponds to the identifier of the next sequential Waiter location. Again, by configuring the Release location 66 to span a cache line, traffic on the host bus is reduced whenever a requester releases ownership of the lock.

Figure 5:
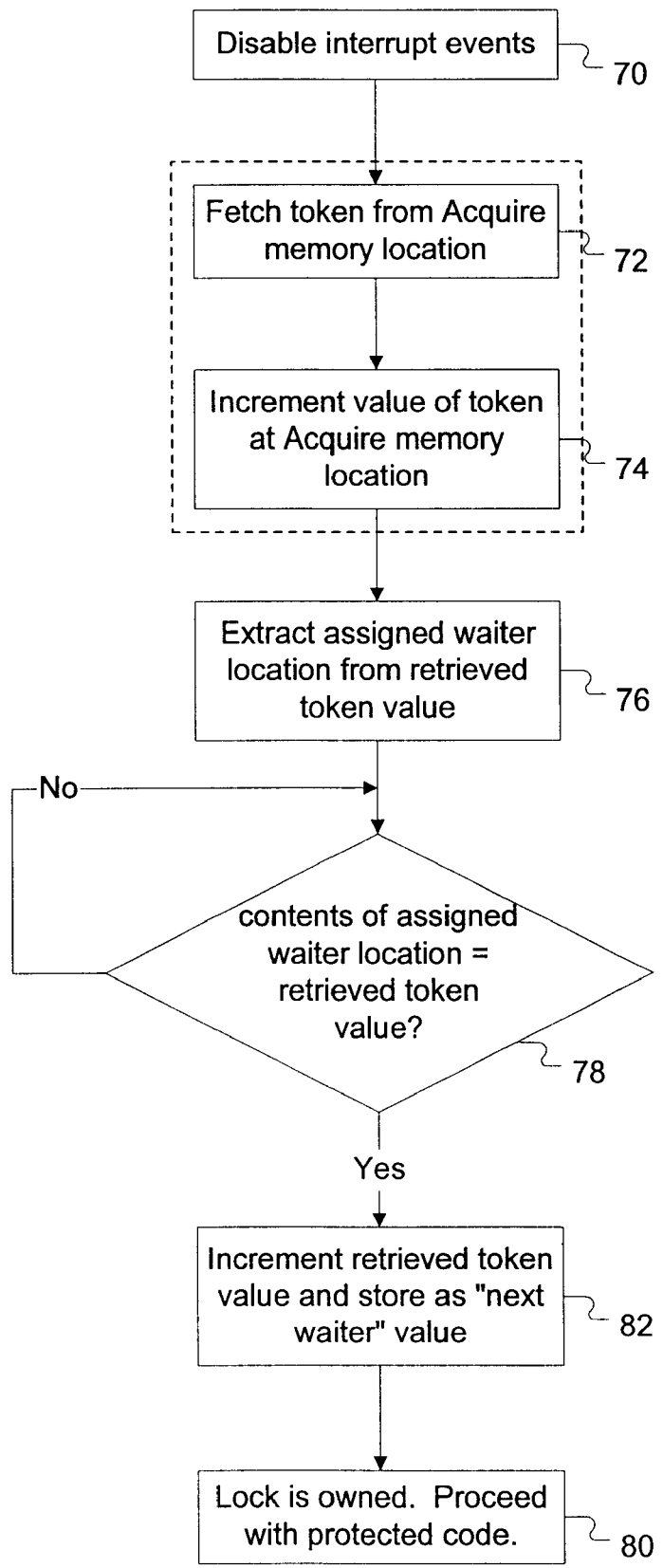
FIG. 5 illustrates a flowchart of an exemplary technique for releasing ownership of the lock that is implemented using the memory structure shown in FIG. 3.

FIG. 5 illustrates a flow chart of an exemplary routine for acquiring ownership of a lock that is implemented using, for instance, the memory structures shown in either of FIGS. 3 and 4, and which may be concurrently performed by multiple requesters attempting to acquire the lock. As illustrated in FIG. 5, when a current requester attempts to acquire ownership of a lock, it first disables all interrupt events (block 70). The current requester then retrieves a token from the field 54 in the Acquire memory location 44 in the array 42 or 64 and saves the retrieved value of the token (block 72). The current requester also increments the value of the token stored in the field 54 of the Acquire location 44 such that the next lock requester retrieves the next sequential value of the token (block 74). In the exemplary embodiment, the acts of retrieving and incrementing the value of the token are performed atomically, such as by executing a fetch-and-add primitive as illustrated by the dashed line around blocks 72 and 74. The atomic operation ensures that another requester does not interleave read/write cycles with the current requester between the acts of retrieving the token value and incrementing the token value. Thus, each requester will be guaranteed to retrieve a different token value and, thus, will be assigned to a different Waiter location 46, 48, 50, or 52.

To determine its assigned Waiter location, the current requester extracts an identifier or line number of the assigned Waiter location from the retrieved token value (block 76). In the exemplary embodiment, the current requester extracts the identifier by combining an appropriate mask (as previously described) with the retrieved token value. The current requester then examines the contents of its assigned Waiter location to determine whether ownership of the lock is available. In the exemplary embodiment, for instance, ownership of the lock is determined by comparing the contents of the Waiter location (e.g., the first quadword) with the retrieved token value (block 78). If the comparison does not result in a match, then the current requester "waits" or "spins" at the assigned Waiter location until a match results. For example, the current requester may simply keep comparing the contents of its assigned Waiter location to the value of its retrieved token until a match results. Alternatively, the current requester may simply wait for a communication informing the current requester that the contents of the assigned Waiter location have been altered. Because each Waiter location includes only one variable that can be altered, the current requester then knows that if the contents of the assigned Waiter location have been changed, then ownership of the lock must be available.

When the contents of the assigned Waiter location match the value of the token retrieved and saved by the current requester, the current requester then may acquire the lock and perform lock operations on the protected region of the shared resource (block 80). In the exemplary embodiment, the current requester also increments the value of its retrieved token and stores it as a "Next Waiter" value (block 82). For instance, the Next Waiter value may be stored in the field 68 of the Release location 66. In any event, because the "Next Waiter" value is the incremented value of the current requester's token, then the "Next Waiter" value also is the same as the value of the token that was retrieved from the Acquire location 44 by the next requester after the current requester. Accordingly, the "Next Waiter" value can be used to release ownership of the lock to the next requester.

Figure 6:
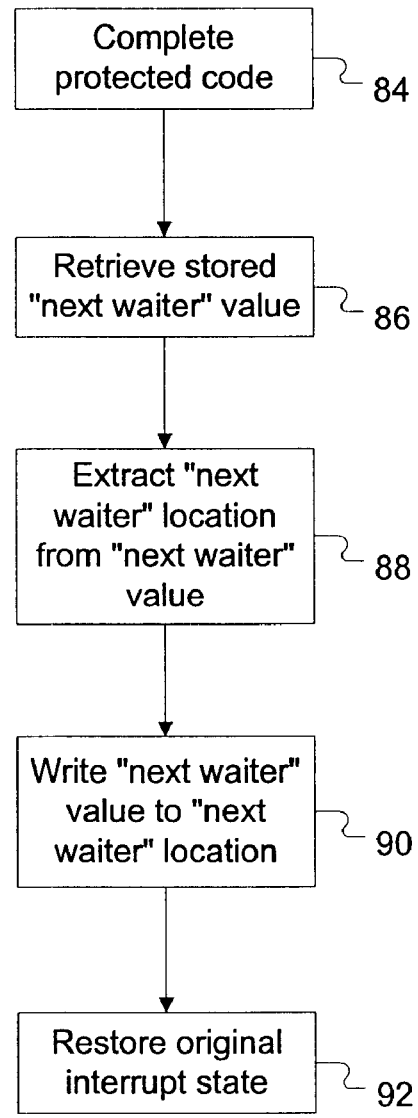

Turning now to FIG. 6, it illustrates a flowchart of an exemplary routine for releasing ownership of the lock to the next requester. Once the current requester has completed the operations protected by the lock (block 84), the current requester is ready to release the lock. In the exemplary embodiment illustrated, to release the lock, the current requester first determines the next requester that should receive ownership of the lock. This determination is accomplished by retrieving the "Next Waiter" value that previously was stored in, for instance, the Release location 66 (block 86). The identifier or line number corresponding to the next Waiter location can be extracted from the "Next Waiter" value by applying a mask in the manner previously discussed (block 88). Once the next Waiter location has been determined, then the current requester releases the lock by writing its stored "Next Waiter" value to the next Waiter location (i.e., to the field 58 of the Waiter location 48) (block 90) and restoring its original interrupt state (block 92).

When the "Next Waiter" value has been written to the next Waiter location, either the next requester is informed that the contents of its assigned Waiter location have been altered and then can acquire the lock, or the next requester will that that ownership is available the next time it compares the contents of its assigned Waiter location to the value of its retrieved token because a match will result. In any event, release of the lock by the current requester to the next requester has been accomplished, and the next requester now becomes the lock owner.

It should be understood that the lock implementation described above with respect to FIGS. 5 and 6 may be implemented in software code embedded in a processor-based device, may exist as software code stored on a tangible medium such as a hard drive, a floppy disk, a CD ROM, etc., or may be implemented in silicon in the form of an application specific integrated circuit (ASIC), as well as in any other suitable manner. Further, it should be understood that although the acts illustrated in FIGS. 5 and 6 have been described in a particular order, this order may be altered and additional or different act performed without departing from the scope and a spirit of the invention. Still further, while the embodiments described above have included processor-based devices which have multiple processors, it should be understood that the invention also is applicable to a single-processor device in which multiple entities (e.g., multiple threads, software, hardware) contend for access to a shared resource.

Thus, it should be clear that the invention may be susceptible to various modifications and alternative forms, and that specific embodiments have been shown in the drawings and described in detail herein by way of example only. Further, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A memory structure to implement a lock to control access to a shared resource by a plurality of requesters in a processor-based device, the memory structure comprising:

a plurality of memory locations, the plurality of memory locations comprising:

a plurality of waiter locations, the number of the plurality of waiter locations corresponding to at least the number of the plurality of requesters having access to the shared resource, wherein the contents of each waiter location indicates whether ownership of the lock is available; and a token location to store a token for acquiring ownership of the lock, wherein each of the plurality of requesters attempting to acquire ownership of the lock retrieves a token from the token location, wherein the number of the plurality of waiter locations corresponds to the number of the plurality of requesters having access to the shared resource rounded up to the next power of two, wherein a requester waiting at a particular waiter location may acquire ownership of the lock when the contents of the particular waiter location correspond to the value of the token retrieved by that requester from the token location, wherein the value of the token stored at the token location is altered each time the token is retrieved, wherein the value of the retrieved token corresponds to a particular waiter location of the plurality of waiter locations, and wherein only the requester that retrieved the corresponding retrieved token waits at the particular waiter location to acquire ownership of the lock.

2. The memory structure as recited in claim 1, wherein the size of each of the memory locations corresponds to a cache line size.

3. The memory structure as recited in claim 1, wherein the plurality of memory locations comprises a release location, the contents of the release location corresponding to a next waiter location of the plurality of waiter locations at which a requester that retrieved a token corresponding to the next waiter location may acquire ownership of the lock.

4. The memory structure as recited in claim 3, wherein the size of each of the memory locations corresponds to a cache line size.

5. The memory structure as recited in claim 1, wherein the token is retrieved from the token location and the value of the token stored at the token location is altered atomically.

6. A lock to control access to a shared resource by a plurality of requesters in a processor-based device, the lock comprising:
   a plurality of memory locations, the size of each of the plurality of memory locations corresponding to a cache line size, wherein the plurality of memory locations comprises:
      a plurality of waiter locations, the number of the plurality of waiter locations corresponding to at least the number of the plurality of requesters having access to the shared resource, wherein the contents of each waiter location indicates whether ownership of the lock is available; and
      a token location to store a token for assigning a waiter location of the plurality of waiter locations to each requester of the plurality of requesters attempting to acquire ownership of the lock,
   wherein the number of the plurality of waiter locations corresponds to the number of the plurality of requesters having access to the shared resource rounded up to the next power of two,
   wherein each of the plurality of requesters attempting to acquire ownership of the lock determines whether ownership is available by examining the contents of its respective assigned waiter location, and
   wherein ownership of the lock is available to a particular requester of the plurality of requesters when the contents of its respective assigned waiter location corresponds to the value of the token retrieved by the particular requester from the token location.

7. The lock as recited in claim 6, wherein the value of the token stored at the token location is altered each time the token is retrieved.

8. The lock as recited in claim 7, wherein the value of the token is retrieved and altered atomically.

9. A processor-based device, comprising:
   a plurality of processors;
   a shared resource accessible by the plurality of processors, wherein access to the shared resource by the plurality of processors is based on ownership of a lock; and
   a memory accessible by the plurality of processors, the memory comprising:
      a plurality of waiter memory locations, wherein the number of the plurality of waiter memory locations corresponds to at least the number of the plurality of processors, and wherein the size of each of the waiter memory locations corresponding to a cache line size, and wherein the contents of each of the waiter memory locations indicates whether ownership of the lock is available; and
      a token memory location to store a token for assigning a waiter memory location to each processor of the plurality of processors attempting to acquire ownership of the lock, wherein a particular requester may acquire ownership of the lock when the contents of its assigned waiter memory location indicate that the ownership is available,
   wherein the number of the plurality of writer memory locations corresponds to the number of the plurality of processors rounded up to the next power of two, and
   wherein the contents of an assigned waiter memory location indicates that ownership of the lock is available when the contents correspond to the value of the token retrieved from the token memory location by the particular processor assigned to that assigned waiter memory location.

10. The device as recited in claim 9, wherein the size of the token memory location corresponds to a cache line size.

11. The device as recited in claim 9, wherein each requester attempting to acquire ownership of the lock retrieves a token from the token memory location, and wherein the value of the token stored at the token memory location is altered each time it is retrieved.

12. The device as recited in claim 11, wherein the token is retrieved and the value of the token is altered atomically.

* * * * *